United States Patent [19]

Strekalov et al.

[11] 4,396,821
[45] Aug. 2, 1983

[54] METHOD OF SPOT ARC WELDING

[75] Inventors: Genrikh N. Strekalov; Anatoly S. Shtyrin, both of Moscow; Viktor I. Matveev, Domodedovo Moskovskoi; Mikhail A. Maryanchik, Moscow; Genrikh S. Garibov, Moscow; Valery G. Chumachenko, Moscow, all of U.S.S.R.; Fedor I. Sloevsky, deceased, late of Moscow, U.S.S.R., by Zoya Vladimirovna Petrischeva, Tatyana Fedorovna Sloevskaya, Ljudmila Fedorovna Feldsherova, administrators

[73] Assignee: Spetsialnoe Proektnokonstruktorskoe I Tekhnologicheskoe Bjuro "Energostalproekt", Moskovskaya, U.S.S.R.

[21] Appl. No.: 213,386

[22] Filed: Dec. 5, 1980

[51] Int. Cl.³ .............................................. B23K 9/00
[52] U.S. Cl. .................................... 219/127; 219/119
[58] Field of Search ................................ 219/127, 119

[56] References Cited

U.S. PATENT DOCUMENTS

| 399,019 | 3/1889 | Coffin | 219/127 |
| 1,344,415 | 6/1920 | Longacre | 219/127 X |
| 3,469,069 | 9/1969 | Allen | 219/127 X |
| 4,163,869 | 8/1979 | Almand | 219/127 X |

OTHER PUBLICATIONS

Cary "Modern Welding Technology", Prentice Hall, Englewood Cliffs, N.J. 1979, pp. 264–266 & 360.

Primary Examiner—Elliot A. Goldberg
Attorney, Agent, or Firm—McAulay, Fields, Fisher, Goldstein & Nissen

[57] ABSTRACT

To spot weld overlapping work pieces contact electrodes are used with concave portions. The workpiece is preheated by the contact electrodes then spot arc welded by a consumable wire fed through one of the contact electrodes. The spot arc weldment takes the final shape of the concave portions.

9 Claims, 2 Drawing Figures

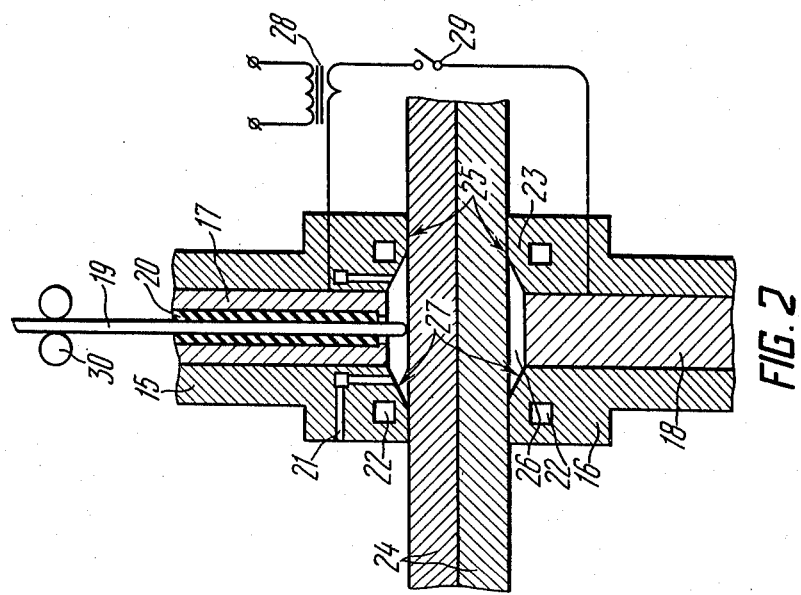
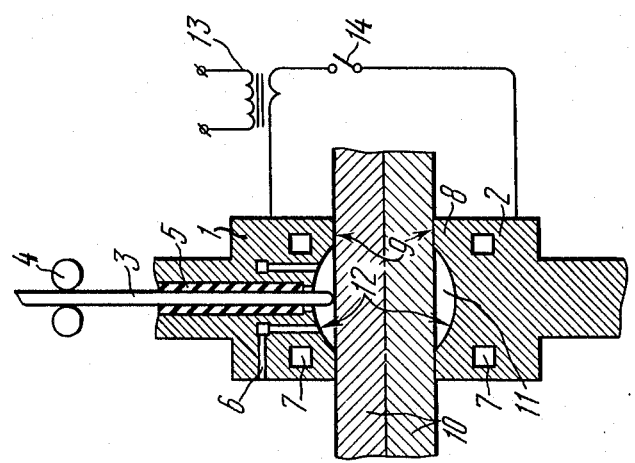

METHOD OF SPOT ARC WELDING

The present invention relates to spot arc welding and to apparatus for realizing same.

The invention can be used for welding parts having thickness of 25-45 mm and more, for welding building metallic structures, in particular, lattice metal structures such as girders, columns, cooling towers, power line supports, ladders, guards, etc.

Furthermore, the invention is useful in shipbuilding, mechanical engineering, automobile industry, railroad car industry, agricultural machinery industry for welding lattice structures and lap joints, in particular, for frame structures, frames, etc. The invention can also be used in automatic welding systems.

The invention can be used successfully for welding both ferrous and non-ferrous metals, in particular, aluminum, alloyed steels, etc.

At present, connection of workpieces into a thick (over 15 mm) packet by welding is difficult because the pressure of the gaseous products of combustion of the arc is insufficient for displacing the liquid metal from the bottom of the metal bath to the surface of the workpieces being melted, which is necessary for obtaining a high depth of melting of the metal being welded.

Thick workpieces (over 15 mm) are arc welded by preliminary partial drilling and subsequent filling of the drilled hole with molten metal from a consumable electrode.

Thicker workpieces (over 15 mm) are also connected by making through holes and subsequent bolting or riveting. Well known in the art are bolted structural elements of supports for power transmission lines, girders, columns; riveted connections of frames of automobiles, railroad cars, etc.

The known methods are labour consuming and economically disadvantageous since they include several different technological operations: drilling, bolting or riveting, which require special tooling which must be changed before each operation.

Also known in the art is a method of spot arc welding by fusion, in which welding is intensified by supplying gas under excessive pressure into the arc zone (cf. USSR Inventor's Certificate No. 223,225 of May 19, 1965 granted in the USSR on Aug. 2, 1968). After attaining a required depth of fusion of the workpieces being welded, the supply of gas is discontinued and an alloying material is fed into the arc zone. Spot arc welding by fusion is effected with the aid of a device comprising a tubular electrode with a dielectric coating, having an opening, in which a welding wire is located. The opening is also used for feeding a protective gas.

After the arc has been initiated, an external force is applied to the tubular electrode for moving it into the welding zone of the basic metal. In 2-3 seconds after the arc has been initiated, gas under excess pressure is fed into the opening of the tubular electrode, which displaces a layer of basic liquid metal from the bottom of the weld bath onto the surface of the workpieces being welded so that fusion of the basic metal is intensified.

As used herein the term "basic metal" refers to the metal of the workpieces being welded.

After a specified depth of fusion of the workpieces being welded has been reached, the supply of gas is stopped and an electrode wire is fed through the opening of the tubular electrode into the arc zone. This wire serves as an alloying material for forming a spot welded joint. Weld is completed by filling the crater with molten metal during the natural break of the arc when it comes to the surface of the weld joint of the workpieces. At this point the feed of the electrode material is stopped.

The above process does not produce high quality welding when the workpieces are made of rolled stock thicker than 15 mm, because the the arc deteriorate with an increase in the thickness of the workpieces to be welded and there is an increased probability of insufficient penetration of molten metal into the workpieces impairing the reliability of the welded joint.

With the increase in the depth of fusion the power of the welding arc becomes insufficient for complete fusion of the workpiece metal, since a considerable portion of heat generated by the arc is consumed for heating the welding spot and near-seam area.

The gas and slags are not completely transferred onto the surface of the liquid weld bath because of the poor stability of the arc process.

As a result, the spot welded joint made by the above known method can have pores, cavities and slag insertions.

The above known method of welding is effected by fixing the workpieces relative to one another by means of known clamping means e.g. screw clamps. In this case the tightness of fit of the workpieces depends on the smoothness of the surfaces thereof. Therefore, molten metal can flow through gaps between the workpieces being welded.

The welding is inefficient and is effected in two steps: the first step consists in making a hole of a definite depth by displacing the molten metal of the bath onto the surface of the workpieces being welded and the second step consists in fusing the hole and forming a spot welded joint with the aid of alloying material.

Such welding requires the use of special electrodes having a complex design and manufactured individually.

Operating such electrodes is intricate since any damage of the external dielectric coating disturbs the stability of the welding process.

Inspection of the quality of the spot welded joint obtained by this method is difficult, particularly under industrial conditions, since it requires the measurement of the hidden depth of fusion.

Visual inspection of such a welded joint is impossible because the absence of any external features characterizing the quality of the spot welded joint, e.g. of the reinforcements at both sides of the joint.

With a view to avoiding the above outlined drawbacks of the prior art, an object of the present invention is to provide a method of spot arc welding and an apparatus for effecting same to are to provide high quality welded joints and to make possible the visual inspection thereof due to deep and intensive fusion of the workpieces.

An equally important object of the invention is to provide a method of spot arc welding and an apparatus for effecting same whereby a high quality welded joint can be obtained and visually inspected for quality.

The present invention resides in a method of spot arc welding by the fusion of workpieces by a consumable electrode, in which welding is performed using a preliminary application of pressure to the workpieces being welded in the zone of welding and their resistance heating by electric current, while the fusion is effected until reinforcements are created and both sides of the spot welded joint.

The preliminary application of pressure on the workpieces to be welded contributes to a tight fit of the workpieces.

It becomes possible, therefore, to pass electric current through these workpieces and to preheat the welding zone.

Preheating of the welding zone to a specific temperature considerably facilitates further arc welding, because all the heat of the welding arc is consumed to fuse the metal of the workpieces being welded in the welding zone, the heat released by the arc is not used for preheating the welding zone.

The present method makes it possible to weld workpieces whose thickness exceeds 15 mm.

The present spot arc welding method is performed under conditions tending to stabilize the welding arc: namely, welding is performed in a closed volume in a protective atmosphere, the metal of the workpieces being welded is in a plastic state in the welding zone. All these factors provide spot welded joint of good quality. Complete fusion of the metal of the spot welded joint results in effective removal of gases and slag insertions onto the surface so that the joint has no pores, cavities or slag insertions.

Since the workpieces being welded are subjected to pressure during the entire process of welding, a tight contact between these members is provided and the possibility of outflow of molten metal of the joint is eliminated.

A spot welded joint obtained by the present method makes it possible to carry out the visual quality inspection of a welded joint having reinforcements at both its sides.

Furthermore, preheating reduces the thermal shock at the instant of the local arc temperature action on the members being welded and this has a positive effect on the structure of the near-seam zone.

The pressure on the welded workpieces may be applied along the periphery of the planned spot welded joint.

The heat generated during the contact preheating spreads through the workpieces being welded from the periphery of the planned spot welded joint to its center (from the point of interaction of the contact electrodes with the workpieces) and this is particularly advantageous when welding workpieces whose thickness does not exceed 30 mm in an assembled unit.

As used herein, "contact preheating" refers to preheating by electric current using the resistance of the material of the workpieces and directly applying these workpieces to the contact electrodes coupled to a power supply source.

The pressure may also be applied along the axis of the intended spot welded joint.

In this case, due to the concentrated preheating the design temperature at the welding spot is rapidly obtained.

This makes it possible to weld very thick pieces (up to 30–50 mm).

The temperature along the axis of the intended spot welded joint can in this case reach 1,100° C., while in the preceding case such a temperature is obtained annularly along the periphery around the spot welded joint, whereas in the center it is equal to 800° C. and for welding thick workpieces (30–50 mm).

When welding alloyed steels, the workpieces to be welded with reinforcements at their both sides are preferably heated to a temperature sufficient for removing the residual stresses.

According to the present invention, the welding process can be effected in an apparatus having a consumable electrode and which, according to the invention, has a pair of contact electrodes arranged in opposition; at least one of these electrodes is provided with a central hole to accommodate a consumable electrode, while the surfaces contacting the workpieces being welded have a concave central portion whose shape corresponds to the calculated shape of the reinforcements at both sides of the welded joint.

The presence of contact electrodes makes possible contact preheating of the workpieces being welded. The concave surface of the central portion of the contact electrodes permits welding by penetrating fusion. The lower contact electrode also serves as a substrate and contributes to formation of a reinforcement at the back side of the workpiece being welded, which is a criterion of visual inspection of the welded joint.

This arrangement permits connection of 30 mm thick workpieces using a process of spot arc welding.

The apparatus is simple in design, can be made and utilized at any production plant having experience in the manufacture and application of systems for spot arc and contact welding.

Welding, according to the invention, can also be effected in an apparatus having a consumable electrode and which comprises a pair of contact electrodes arranged in opposition and having surfaces contacting the workpieces being welded and provided with a central concave portion repeating the shape of the reinforcements at both sides of the spot welded joint and a central opening accommodating additional contact electrodes capable of moving in an axial direction towards each other for producing pressure along the axis of the planned welded joint, at least one these electrodes being provided with a central hole for accommodating a consumable electrode.

The accommodation of additional contact electrodes in the central holes of the contact electrode and their axial displacement towards one another assists in obtaining concentrated heating of the workpieces being welded along the axis of the planned spot welded joint thus improving the conditions of the arc process and widening the range of application of the spot arc welding.

This design permits connection of 30–50 mm thick workpieces using spot arc welding.

The use of the apparatus for welding workpieces having a thickness less than 30 mm is less expedient than in the former apparatus because the latter is more complicated.

The invention is further described by way of example with reference to the accompanying drawings, in which:

FIG. 1 shows a general cross-sectional view of spot arc welding apparatus, in which the pressure on the workpieces being welded is applied along the periphery of the planned spot welded joint, according to the invention;

FIG. 2 shows a general cross-sectional view of spot arc welding apparatus, in which the pressure on the workpieces being welded is applied along the axis of the planned spot welded joint, according to the invention.

The spot arc welding method of this invention consists in feeding the consumable electrode to the welding zone, initiating an electric arc between the consumable electrode and the workpieces being welded, fusing the metal of these workpieces and stopping the feed of the welding wire.

According to the invention, welding is effected by preliminarily applying pressure to the workpieces in the welding zone.

To this end, before feeding the consumable electrode, the workpieces are pressed together by the contact electrodes to allow electric current to be passed therebetween.

After that, contact heating of the workpieces is effected using electric current.

For this purpose, electric current from a power source connected to the contact electrodes is fed through the contact electrodes (used for pressing together the workpieces) to these workpieces.

In this case electric current flows through the workpieces using the shortest way in the welding zone.

Since the workpieces offer ohmic resistance to the electric current, they are heated in the welding zone to a temperature not exceeding the temperature of recrystallization of the metal of the workpieces.

After that, a consumable electrode is fed to the preheated welding zone, an arc is initiated between the consumable electrode and the workpieces and they are fused in the welding zone.

With such fusion a spot welded joint is obtained, which is characterized by the presence of reinforcements at both sides of this welded joint and which permits visual inspection of the welding quality.

For this purpose, prior to feeding the consumable electrode, the workpieces are pressed together by the contact electrodes so that the workpieces are in contact with the peripheral portion of the surface of the contact electrodes, while the central part of this surface does not contact the workpieces to be welded, namely with that portion of the workpieces where a welded joint is intended. The pressure is sufficient to provide an electrical contact between the workpieces and the contact electrode so that an electric current can blow therebetween. After that contact, preheating of the workpieces is effected by electric current.

For this purpose, an electric current from a power source connected to the contact electrodes is passed through these contact electrodes.

In this case electric current takes the shortest way through the workpieces being welded between the peripheral portions of the contact electrodes contacting these workpieces and preheats the workpieces in the welding zone.

The heat released spreads from the periphery to the center of the planned welded joint.

The temperature of the workpieces at the point of the planned welded joint produces a plastic state of the metal of these workpieces at this point and this permits workpieces of up to 30 mm thick to be welded.

For this purpose, a consumable electrode is fed to the welding zone, an arc is initiated between the consumable electrode and the workpieces to be welded and complete fusion of metal is the welding zone is effected.

The generated heat increases the temperature of the metal of the workpieces being welded in the welding zone, namely along the axis of the planned spot welded joint, to a temperature not exceeding the temperature of recrystallization of this metal thus transforming it to a plastic state, which makes it possible to weld workpieces of up to 30–50 mm thick.

When workpieces of alloyed steels are welded, after a spot welded joint has been produced having reinforcements at both its sides, an electric current is passed through the workpieces once again to preheat the welding zone to a temperature sufficient for removing residual stresses.

The method of spot arc welding by fusion of the workpieces being welded by a consumable electrode, in which the pressure on the workpieces is applied along the periphery of the planned spot welded joint, is effected using an apparatus shown in FIG. 1, which comprises a pair of contact electrodes 1, 2 arranged in opposition.

Made in the contact electrode 1 along its axis is a hole, in which is located a consumable electrode 3 coupled to a feed mechanism 4. Mounted between the contact electrode 1 and the consumable electrode 3 is a replaceable dielectric sleeve 5 whose inner diameter is equal to the diameter of the electrode 3. Provided in the contact electrode 1 is a passage 6 for feeding an protective gas. Both electrodes 1 and 2 have cooling passages 7.

Each contact electrode 1 and 2 has a peripheral flat pressure portion 8 with surfaces 9 facing workpieces 10 to be welded and contacting the latter and a central concave portion 11 with surfaces 12.

The shape of each concave portion 11 of the electrodes 1 and 2 corresponds to the calculated shape of the reinforcements arranged at both sides of the welded joint.

The consumable electrode 3 is fed with a direct current from a power supply source (not shown in FIG. 1).

The contact electrodes 1 and 2 are connected to a current supply source 13.

Switch 14 is used for switching the contact electrodes 1 and 2 on and off.

To spot arc weld by fusion of the workpieces to be welded by a consumable electrode, wherein pressure on the workpieces is applied along the axis of the planned spot welded joint, the apparatus shown in FIG. 2, is used which includes a pair of contact electrodes 15, 16 arranged in opposition and having a central axial hole accommodating additional internal movable contact electrodes 17, 18, with respect to which the contact electrodes 15, 16 are external.

Along the axis of the contact electrode 17 is provided a bore, through which passes a consumable electrode 19. Installed between the consumable electrode 19 and the internal contact electrode 17 is a replaceable dielectric sleeve 20 whose inner diameter corresponds to the diameter of the consumable electrode 19. Provided in the contact electrode 15 are passages 21 for supplying a protective gas into the welding zone. Additionally, cooling passages 22 are provided in both electrodes 15, 16.

The external contact electrodes 15, 16 have each a flat pressure portion 23 located along the periphery of the contact electrodes 15 and 16 having surfaces 25 facing workpieces 24 to be welded and a central concave portion 26 with surfaces 27.

The shape of each surface 27 corresponds to the design shape of the reinforcements disposed at both sides of the welded joint.

The consumable electrode 19 is fed from a d-c power supply source (not shown in FIG. 2).

The contact electrodes 15, 16, 17 and 18 are connected to a power supply source 28. A switch 29 is provided for switching on and off the contact electrodes 15, 16, 17 and 18.

The consumable electrode 19 is connected to its feed mechanism 30.

Before the welding, the workpieces 10 are placed between the contact electrodes 1, 2 acted on by the pressure providing a contact between the workpieces 10 to be welded and the contact electrodes 1, 2. This pressure makes it possible to pass an electric current through the workpieces 10 and the contact electrodes 1, 2. In this case the contact electrodes 1, 2 press the workpieces 10 by their flat pressure portions 8. After that, by turning on the switch 14, an electric current from the power source 13 is fed to the contact electrodes 1, 2.

The electric current flows in the shortest way through the workpieces 10 to be welded between the portions 8 of the contact electrodes 1, 2 and preheats the workpieces 10 in zone of the planned spot welded joint.

The generated heat spreads from the periphery to the center of the planned spot welded joint.

The temperature of the workpieces to be welded in the zone of the planned spot welded joint must not exceed the temperature of beginning of recrystallization of the metal of the workpieces being welded. After a calculated preheating temperature has been obtained, the contact electrodes 1, 2 are disconnected from the power source 13 by operating the switch 14. A protective gas is supplied to the welding zone through the passages 6, then the feed mechanism 4 feeds the consumable electrode 3 to the welding zone, an arc is initiated and the workpieces 10 to be welded are fused in the space limited by the electrodes 1, 2.

The arc process is continued until complete fusion of the workpieces with penetration of molten metal to both surfaces of the workpieces 10 being welded, then the feed of the consumable electrode 3 is stopped. When the arc comes to the surface, it extinguishes naturally.

As a result, a spot welded joint is formed having reinforcements at both sides of the welded workpieces. The whole welding process can be automated.

The contact electrodes are cooled during the welding by forcing a cooling liquid through the passage 6.

The apparatus shown in FIG. 2 operates as follows.

Before welding, the workpieces 24 are placed between the external contact electrodes 15, 16 and are clamped between additional internal contact electrodes 17, 18, on which is applied a pressure allowing an electric current to be passed between the contact electrodes 17, 18 and the workpieces 24 to be welded.

After that an electric current is fed to the contact electrodes 17, 18 from the power supply source 28 by closing the switch 29. The electric current passes through the workpieces to be welded between the contact electrodes 17, 18 along the axis of the planned spot welded joint. Acting against the ohmic resistance of the metal of the workpieces to be welded, the electric current preheats the welding zone directly along the axis of the planned spot welded joint.

According to the calculations, the temperature of the metal of the workpieces to be welded in the welding zone must not exceed the temperature of recrystallization of this metal.

After preheating the workpieces to be welded 24, the electric current is switched off by operating the switch 29, the external contact electrodes 15, 16 are lowered onto the surface of the workpieces 24 and a pressure is applied thereon for pressing together the workpieces 24 to be welded and provide their tight contact excluding a possibility of flow of liquid metal between these workpieces.

Then the additional internal contact electrodes 17, 18 are raised. A protective gas is fed into the welding zone through passages 21 and a feed mechanism 30 feeds the consumable electrode 19 into the welding zone. An arc is then initiated and the workpieces 24 to be welded are fused within a closed space defined by the electrodes 15, 16, 17, 18.

The arc process is conducted up to complete penetration of molten metal through the workpieces 24 and onto the surfaces 27 of the workpieces to be welded; thereafter the feed of the consumable electrode 19 is stopped. As soon as the arc comes to the surface, it breaks naturally.

As a result, a spot welded joint is formed having reinforcements at both sides of the workpieces to be welded.

The entire process of welding can be automated.

The contact electrodes are cooled in the process of welding by feeding a cooling fluid through the passages 22.

Either apparatus shown in FIGS. 1 or 2 can be used for welding alloyed steels.

For welding workpieces of alloyed steels of up to 30 mm thick it is preferable to use the apparatus shown in FIG. 1. For welding workpieces of alloyed steels having thickness preferably 30–50 mm it is preferable to use the apparatus shown in FIG. 2. In this case, after reinforcements have been formed at both sides of the welded joint, an electric current from power sources 13 and 28, respectively, is passed through the contact electrodes 1, 2 or 15, 16 and the workpieces 10 and 24, respectively, to preheat the obtained spot welded joint to a temperature sufficient for removal of the residual stresses.

The invention will be better understood from the following example of a method of spot arc welding with fusion of workpieces to be welded by a consumable electrode, in which the pressure on the workpieces to be welded is applied along the periphery of the intended spot welded joint.

EXAMPLE 1

Take two workpieces of low carbon steel containing $C=0.17\%$, $Mn=0.50\%$, $Si=0.20\%$, each workpiece being 16 mm thick. Mark on these workpieces a point, where a spot welded joint will be formed. Align the axes of the contact electrodes and marked spot welded joint. Secure the workpieces to be welded by the contact electrodes.

Apply pressure of $P=600$ kg on the contact electrodes by means of pneumatic cylinders. After that turn the switches on to connect the contact electrodes to the power supply source and pass an electric current of $I=15000$ A through these electrodes and the workpieces to be welded.

Heat the workpieces to a temperature $T=700°$ C. along the axis of the marked spot welded joint then disconnect the contact electrodes from a power supply source by means of the switch.

Supply a protective gas ($CO_2+O_2$) in an amount of 15 l/min to a welding zone and feed the consumable electrode having a diameter $d=4$ mm at a rate of $V=0.09$ m/sec, the electrode being connected to a d-c power source: $I=1100$ A, $V=40$ V. Thus, we initiate an arc and perform fusion of the metal of the workpieces being welded at the point the marked welded joint.

12 Seconds after starting the heating of the welding zone the feed of the consumable electrode is stopped. After the fusion has been finished, the arc comes to the surface of the obtained spot welded joint and breaks down. After that the contact electrodes are raised by the pneumatic cylinder.

As a result, we obtain a spot welded joint with reinforcements at both its sides.

The obtained welded joint meets all modern requirements imposed on welded articles.

A macrograph of the section along the above obtained welded joint has shown complete absence of gaseous pores, cavities, slag insertions and also the absence of a visible interface between the spot welded joint and the workpiece. The average (calculated) diameter of the obtained spot welded joint is $D=30$ mm.

The mechanical strength of the section of the spot welded joint obtained was equal to $P=22.5$ tons.

EXAMPLE 2

This example illustrates the spot arc welding with fusion of workpieces to be welded by a consumable electrode, in which the pressure on the workpieces to be welded is applied along the axis of the marked spot welded joint.

Take two workpieces made of low-carbon steel with $C=0.18\%$; $Mn=0.52\%$; $Si=0.22\%$, each having thickness $\delta=22$ mm. Mark a point for forming a spot welded joint on each workpieces. These workpieces are then placed between the contact electrodes. Align the axes of the contact electrodes and marked spot for the welded joint. Secure the workpieces to be welded by the inner contact electrodes and apply on these electrodes pressure $P=1000$ kg by means of pneumatic cylinders.

After that, connect the contact electrodes to the power source using the switch and pass through these workpieces electric current $I=15000$ A.

Heat the workpieces to be welded to a temperature $T=900°$ C. along the axis of the planned spot welded joint and after that disconnect the contact electrodes from the power source using the switch.

Lower the external contact electrodes on the workpieces to be welded and apply a pressure $P=600$ kg to these electrodes. Then the internal contact electrodes are raised. Feed a protective gas ($CO_2+O_2$) in an amount of 20 l/min to the welding zone and the consumable electrode $d=4$ mm at a rate of $V=0.11$ m/sec, said electrode being connected to d-c power source $I=1500$ A, $V=45$ V.

As a result, an arc is initiated and the metal of the workpieces to be welded is fused at the point of the planned spot welded joint.

20 seconds after the start of heating of the welding zone the feed of the consumable electrode is stopped.

After the fusion the arc comes to the surface and disintegrates; after that the pressure is taken off the contact electrodes.

As a result, we obtain a spot welded joint with reinforcements at both its sides. The obtained welded joint meets all modern requirements imposed on welded joints.

A macrograph of the section along the obtained spot welded joint has shown that it has no gaseous pores, cavities, or slag insertions and is characterized by the absence of the visible interface between the spot welded joint and the workpiece.

The average (calculated) diameter of the obtained joint $D=38$ mm.

The mechanical tests for tensile strength of the obtained spot welded joint have shown that the shearing strength of a section of one welded spot is $P=27.1$ t.

EXAMPLE 3

This example illustrates a proposed example of a method of spot arc welding of alloyed steel with fusion of the workpieces to be welded by a consumable electrode, through which the pressure on the workpieces is applied along the periphery of the intended spot welded joint.

Take two workpieces of nickel-chromium steel containing: $C=0.15\%$; $Mn=0.45\%$; $Si=0.50\%$; $Cr=0.75\%$; $Ni=0.45\%$; $Cu=0.30\%$ each workpiece having thickness of 14 mm.

These workpieces are placed between the contact electrodes in the apparatus shown in FIG. 1 and the welding method is effected as described in Example 1.

In so doing, the workpieces being welded are heated at the planned welded joint to $T=800°$ C., a protective gas is fed at a flow rate of 18 l/min, while the other parameters of the process are kept as in Example 1.

The obtained spot welded joint is normalized. For this purpose, the contact electrodes are again connected to the power source providing a current of 15000 A and the welded joint is heated to $t=900°$ C.

After that the contact electrodes are disconnected from the power source and the pressure on these electrodes is removed.

The entire process of welding from the beginning of the fusion took 16 seconds.

The average (calculated) diameter of the spot welded joint was equal to 26 mm. The shearing strength of one spot welded joint during mechanical tensile tests was equal to $P=32.3$ t.

The macrograph of the section of the spot welded joint has shown that the joint has no tempering structures in the vicinity of the welding zone.

The present welding process provides higher efficiency compared to the known processes of spot welded joints in connection with the preheating the workpieces to be welded.

The welds obtained are stable because welding is conducted under improved technical conditions, namely, in a closed space in a protective medium with preheating of the workpieces to be welded.

The apparatus for carrying out this method is simple to manufacture and service and can be used under any industrial conditions, where spot arc and contact welding is used.

The present method makes it possible to weld workpieces without special treatment of the surface.

The method is simple and economically expedient.

The apparatus for effecting the method can be based on available spot contact welding machines having a power of 200 kVa. The weight of such an installation is about 3 tons.

This apparatus is intended to replace existing massive welding equipment designed for spot contact welding of thick workpieces like welding machine-presses welding means of direct current or low-frequency current (2-4 Hz), which are characterized by a constant forces during the whole process. In this case the high rigidity of the workpieces requires application of great forces to the contact electrodes; the high current density on the contact electrodes causes their quick heating and reduces their resistance to the action of mechanical forces.

What is claimed is:

1. A spot arc welding method comprising:

applying pressure during substantially the entire welding operation on workpieces to be welded in a closed welding zone under a protective atmosphere;

resistance preheating, by means of contact electrodes having flat contact portions and central concave portions, of the workpieces by passing the electric current therethrough;

feeding a consumable electrode to said zone through one of said contact electrodes;

striking an arc between said consumable electrode and said workpieces to form a welded joint between the thus preheated workpieces by fusing metal thereof and continuing such fusing until reinforcements having a shape corresponding to said concave portions form on both sides of said welded joint whereby heat released by said arc is used substantially completely for said fusing and the quality of the resulting weld may be visually inspected.

2. The method of claim 1 wherein the metal of the workpieces is in a plastic state.

3. The method of claim 1 wherein pressure on the workpieces is applied along the periphery of the intended spot welded joint.

4. The method of claim 1, wherein pressure on the workpieces is applied along the axis of the intended spot welded joint.

5. The method of claim 1, including the additional step of heating said workpieces after formation of said reinforcements to a temperature sufficient to remove residual stresses.

6. The method of claim 1, wherein said workpieces are preheated to a temperature not exceeding the recrystallization of the metals constituting said workpieces.

7. The method of claim 1, wherein said pressure is applied by contact electrodes such that the workpieces are in contact with the peripheral position of the surface of said electrodes while the central part of said surface does not contact that portion of the workpieces where a welded joint is intended.

8. The method of claim 1, wherein said protective atmosphere consists of a mixture of carbon dioxide and oxygen.

9. The method of claim 1, wherein said contact electrodes are cooled during said welding operation by means of a cooling fluid.

* * * * *